United States Patent
Dvorak

[15] 3,678,792
[45] July 25, 1972

[54] METAL PLATE SHEARS
[72] Inventor: Frank Dvorak, Box 134, Cosmos, Minn. 56228
[22] Filed: Dec. 15, 1970
[21] Appl. No.: 98,414

[52] U.S. Cl. ............................83/459, 83/461, 83/588, 83/627, 83/635, 83/636, 83/639, 83/698, 100/291
[51] Int. Cl. ............................B26d 5/08, B26d 7/02
[58] Field of Search............83/588, 627, 635, 639, 636, 83/461, 459, 698; 100/291

[56] References Cited

UNITED STATES PATENTS

| 80,132 | 7/1868 | Burr | 100/291 X |
|---|---|---|---|
| 353,606 | 11/1886 | Stupakoff | 100/291 |
| 552,710 | 1/1896 | Jefferies | 83/627 X |
| 1,925,365 | 9/1933 | Berg | 100/291 X |
| 2,400,996 | 5/1946 | Iversen | 83/588 |

FOREIGN PATENTS OR APPLICATIONS

| 780,165 | 7/1957 | Great Britain | 83/627 |
|---|---|---|---|

Primary Examiner—Frank T. Yost
Attorney—Robert M. Dunning

[57] ABSTRACT

A metal plate shears for cutting large sheets of metal in which four rollers are hydraulically slid between a guide way and four inclined ramps so as to force a cutting blade downward through a large metal plate. A high leverage hydraulic clamp serves to hold the plate in place during the shearing operation. The edge of the lightweight cutting blade is kept straight by a unique truss arrangement mounted on the side of the blade.

10 Claims, 8 Drawing Figures

INVENTOR
FRANK DVORAK
BY Robert M. Dunning
ATTORNEY

INVENTOR
FRANK DVORAK
BY Robert M. Dunning
ATTORNEY 3,678,792

METAL PLATE SHEARS

BACKGROUND OF THE INVENTION

In the metal working art the cutting or shearing of metal plate has proven to be very difficult. The large cuts have necessitated extremely large and extremely expensive machinery in order to generate the necessary pressure. At the same time the thickness of metal that can be cut has been limited. One typical problem in the prior art is that the cutting blade often flexes or warps under the tremendous hydraulic pressure applied to it. Consequently, very large blades have been used in order to achieve the necessary strength. These large blades have required large hydraulic actuators and thus large costly machines. Another prior art problem involves the apparatus for holding the piece of metal plate in place while it is being sheared. In the prior art the solution to this problem has generally involved a large number of hydraulic clamps positioned at various locations on the plate. The multitude of clamps again has contributed to an increase in size in the machine and also an increase in maintenance problems. A common problem in the prior art is finding hydraulic fluid on the work from one or more clamps that have small leaks in them. The biggest problem, however, has always been how to get the largest amount of cutting pressure at the lowest cost and in the minimum space. My invention accomplishes this objective and overcomes all of the problems recited above.

SUMMARY OF THE INVENTION

Briefly, my invention contemplates using a single hydraulic cylinder to move four rollers along a guide track and against four slightly inclined ramps. The inclined ramps are attached to the top of the shearing blade which is forced downward by the action of the rollers. Since a number of rollers are used the pressure is distributed evenly over the blade thus resulting in a lessened tendency to warp or distort the blade. Consequently, a lighter cutting blade may be used. In addition, the present invention incorporates a unique bridge-like truss on the side of the blade to provide great rigidity while maintaining a relatively low weight. Thus, once again the blade can be made lighter and the overall size of the machine can be greatly reduced in comparison to the prior art. Furthermore, the use of ramps to move the blade permit low hydraulic pressure, thus making the machine safer to operate. Another safety feature inherent in my design arises from the capability in the machine to stop the blade at any point by simply releasing the hydraulic activating switch whereupon the blade will immediately begin to withdraw. Prior machines have usually been of the type in which a cycle once initiated is unstoppable till completed. Instead of a large number of leaky hydraulic clamps the present invention contemplates a pair of lever operated cranks which operate from only two hydraulic cylinders positioned below the working surface so that small leaks are of no consequence. The increased leverage provided by the lever arms allow the two small hydraulic cylinders to do the work that a large number of units did in the prior art. It may thus be seen that it is an object of my invention to provide a lighter weight and consequently less expensive metal plate shears which can handle larger and thicker metal plates. Further objects and advantages will become apparent upon consideration of the following drawings and detailed description.

BRIEF DESCRIPTION OF THE DRAWINGS

FIG. 4 is a top view of the machine as taken along line 4—4 in FIG. 1.

DESCRIPTION OF THE PREFERRED EMBODIMENT

Figure 1:
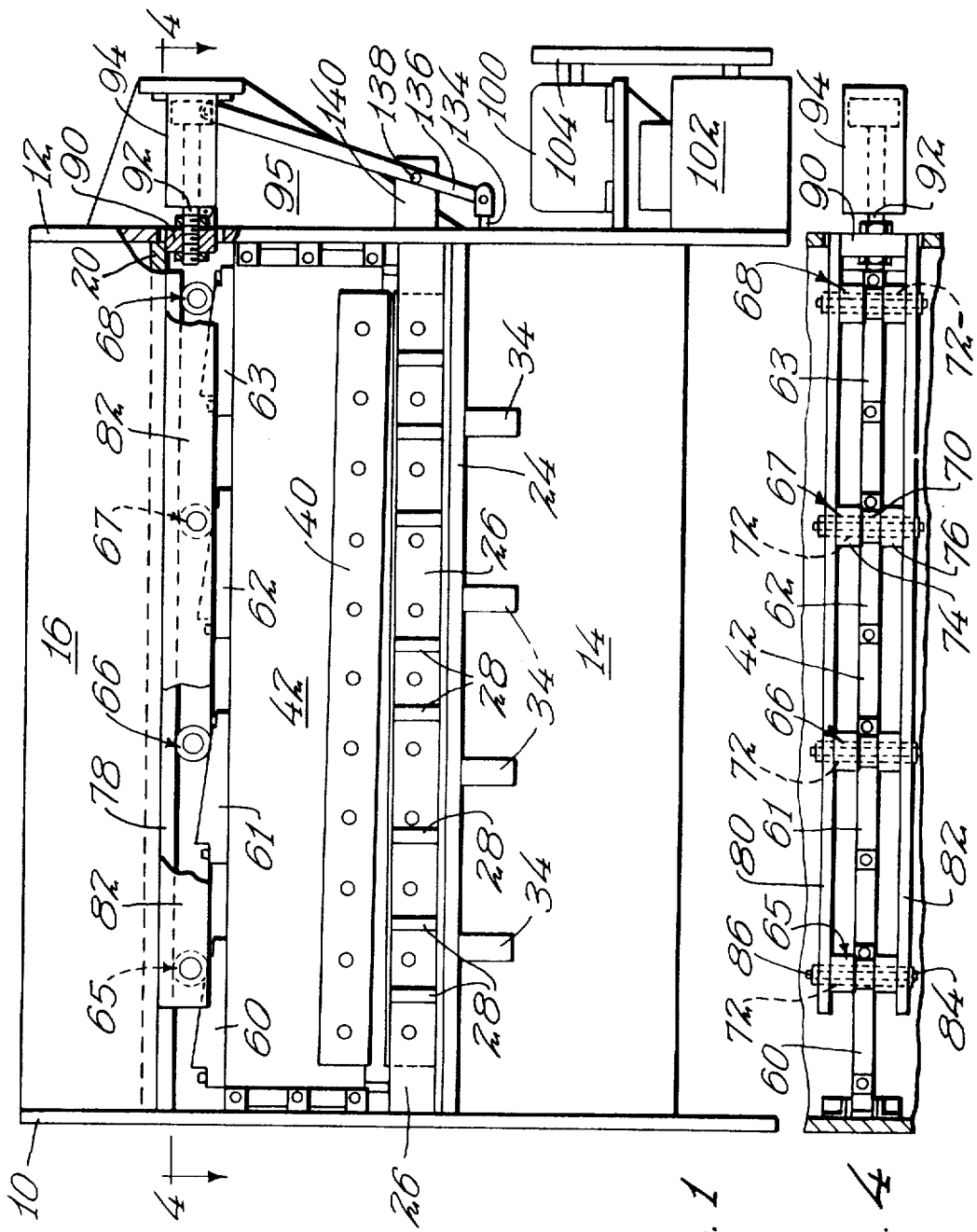
FIG. 1 is a front elevational view of my invention with portions of the pusher bar cut away so as to better show the rollers therebehind.
Figure 2:
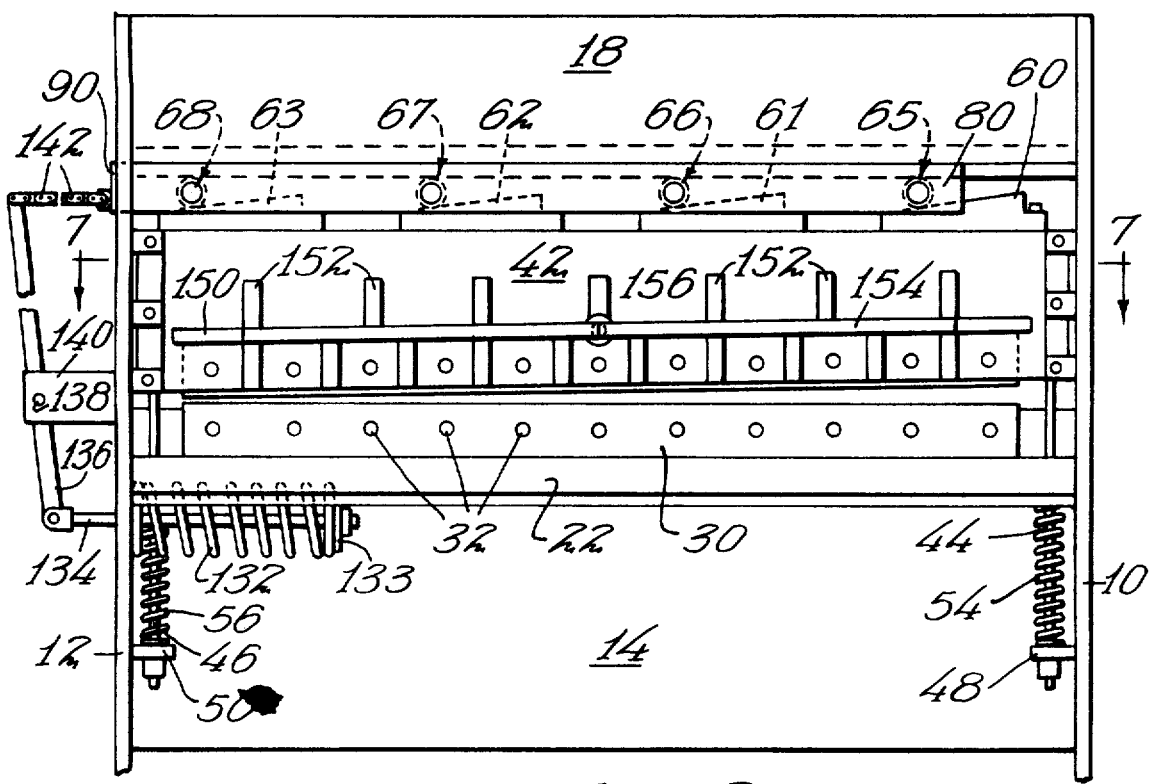
FIG. 2 is a rear elevation of the present invention with the hydraulic equipment omitted for clarity.
Figure 3:
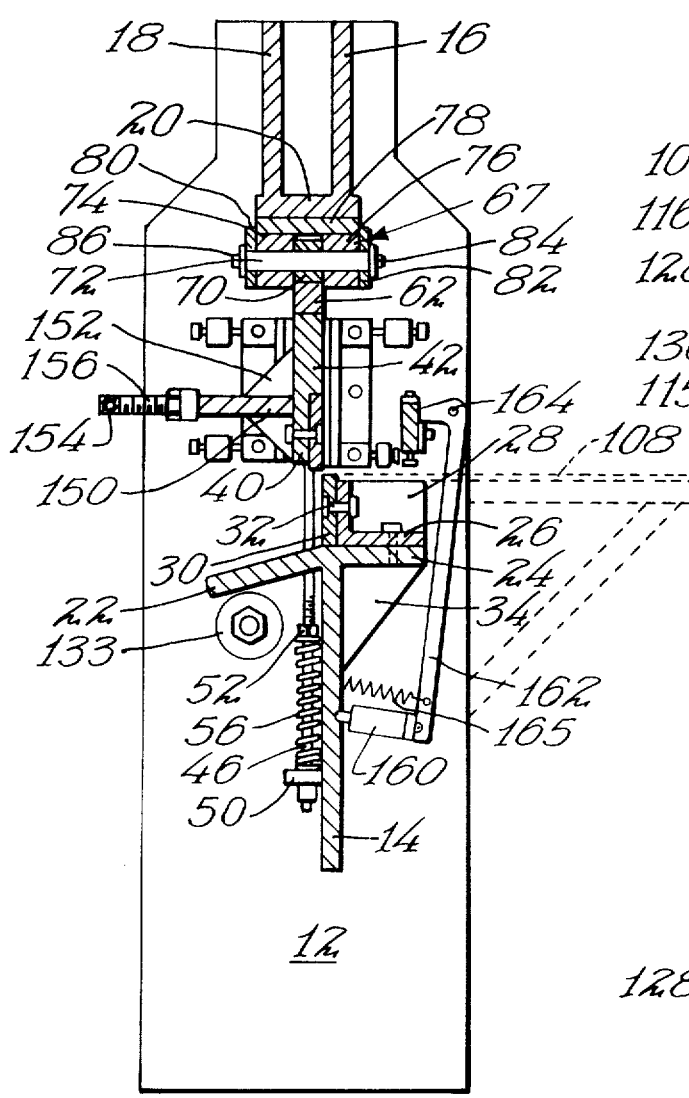
FIG. 3 is a sectional side view of the invention to better show the relative positions of the parts.

The overall configuration of my invention may be best understood by initially referring simultaneously to FIGS. 1, 2 and 3. FIG. 1 is a front view of the machine showing a pair of side or end panels 10 and 12 which are spaced by a transverse member 14 on the bottom and a pair of transverse members 16 and 18 at the top. In the side sectional view of FIG. 3 it may be seen that the transverse members 16 and 18 are welded together at their bottom edges to a horizontal transverse member 20. All of the transverse members are welded to the sides of the machine to keep the cost down and provide as rigid a structure as possible. Still referring simultaneously to all three figures it may be seen that the top of transverse member 14 has a rearward extending portion 22 which slants downward slightly and a forward extending portion 24 which is horizontal. Downward inclined portion 22 helps to remove sheared metal from the machine. Horizontal transverse portion 24 is used to mount a right angle reinforcement member 26. Reinforcement member 26 is provided with a number of periodically spaced gussets 28 welded to member 26 so as to provide a very high strength mount for the lower cutting blade 30. Lower cutting blade 30 has four cutting edges one on each corner so that it may be rotated and used continuously even though one or more of the edges has become dull. Cutting blade 30 is mounted to transverse reinforcing member 26 by means of a series of screws 32. Transverse portion 24 is further reinforced from below by a number of triangular shaped gussets 34 which are welded in place and most readily visible in FIG. 1.

In FIG. 1 and FIG. 3 it may be seen that the upper cutting blade 40, which is similar in configuration to the lower blade 30, is mounted in a milled slot in a blade carrier 42. The milled slot is at a slight angle so that blade 40 is positioned at a slight angle so as to cut through the sheet metal plate in a scissors like fashion. However, blade 40 is itself rectangular and has four cutting edges so that it may be rotated to a new position as the edges become dull in the same manner as blade 30. Blade carrier 42 slides in slotted guide ways at each end against frame walls 10 and 12. The detailed structure of these guide ways will be described later with respect to FIG. 5. Blade carrier 42 is supported from below on a pair of steel rods 44 and 46 which extend downward from the blade carrier and through a pair of brackets 48 and 50. As can be seen in FIG. 3 the rods are provided with threads so that a nut 52 thereon will engage the top of a spring 56 positioned about rod 46 and resting on bracket 50. A similar arrangement is used on rod 44 so that blade carrier 42 is carried on springs which may be adjustably tensioned by rotating the nuts on the rods so as to position the cutting blade carrier at a predetermined distance above the lower blade 30.

In FIG. 3 it may be seen that the shearing action is achieved between the two corners of cutting blade 30 and 40 when blade 40 is lowered by blade carrier 42. This lowering action compresses spring 54 and spring 56. The downward thrust on blade carrier 42 is provided by four rollers moving against inclined ramps 60, 61, 62 and 63. These ramps are clearly visible in FIG. 1 where the roller assemblies are identified by the numerals 65, 66, 67 and 68. Returning to FIG. 3 one of the roller assemblies is sectionally shown in greater detail. Ramp 62 is mounted to the top of blade carrier 42. Riding on ramp 62 is a small roller 70 which is carried by an axle 72. Also carried by axle 72 are a pair of larger diameter rollers 74 and 76 which roll along the bottom side of a wear plate 78 which in turn is mounted underneath transverse member 20. Since rollers 74 and 76 have a larger diameter than roller 70 they straddle ramp 62 one on each side, thus, insuring proper alignment. In the same manner roller 74 and 76 are kept in alignment with wear plate 78 by means of a pair of pusher bars 80 and 82 which straddle wear plate 78. Pusher bars 80 and 82 actually extend across the length of the machine and carry each of the four roller assemblies. At each end of axle 72 a small bolt and washer combination designated by the numerals 84 and 86 serve to keep pusher bars 80 and 82 and the entire roller assembly in place on axle 72. Turning to FIG. 1 it may be seen that pusher bars 80 and 82 are connected together at the right side of the machine by a cross piece 90 welded between the two members. (See also FIG. 4) Bolted into cross piece 90 is a push rod 92 connected to a hydraulic cylinder 94 which is mounted between a pair of brackets 95 of which only one is visible in FIG. 1. The front bracket 95 is omitted in FIG. 1 so that the hydraulic cylinder 94 and other apparatus associated therewith may be more easily seen. An electric motor 100 mounted on side panel 12 drives a hydraulic pump 102 by means of a connecting belt and pulley arrangement 104. For clarity the hydraulic lines are omitted since they contemplate apparatus well known to those skilled in the art. The shearing action is initiated by pumping hydraulic fluid from pump 102 into hydraulic cylinder 94. As cylinder 94 expands, push rod 92 moves cross piece 90 and thus pusher bars 80 and 82 to the left in FIG. 1. Each of the roller assemblies roll along the underside of wear member 78 while the central smaller rollers move up the inclined ramp 60 through 63. This action forces blade carrier 42 downward causing blade 40 to slice off any piece of sheet metal inserted between it and blade 30. In FIG. 3 one possible support shelf 108 is shown by dash lines which could be used to help insert metal plate into the shears. FIG. 4 is a top view of the machine as taken along line 4-4 in FIG. 1. The manner in which hydraulic cylinder 94 is connected to cross piece 90 and then pusher bars 80 and 82 is clearly shown in FIG. 4. Also the relative positions of the ramp 60 through 63 and the roller assemblies 65 through 68 are more apparent. In looking at FIG. 1 and FIG. 4 one can readily see that as hydraulic cylinder 94 pushes the roller assemblies to the left not only will the blade be forced downward but a substantial amount of pressure will be exerted towards the left hand side of the machine and against end plate 10. To alleviate the friction that would otherwise result a roller bearing is provided at the left hand end of blade carrier 42 which can better be seen with respect to FIG. 5 and FIG. 6.

Figure 5:
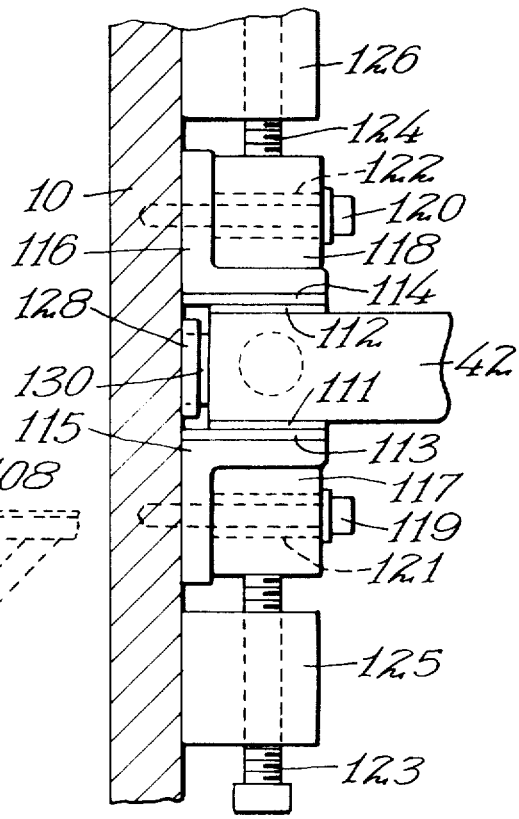
FIG. 5 is a sectional detailed view of the mounting apparatus at the edge of the cutting blade.
Figure 6:
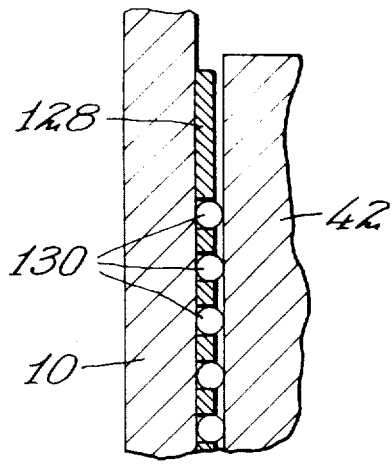
FIG. 6 is a schematic view of the roller bearing arrangement used at the edge of the cutting blade.

In FIG. 5 is may be seen that blade carrier 42 has a pair of wear plates 111 and 112 affixed to the sides of its end. These wear plates slide against another pair of wear plates 113 and 114 which are mounted onto a pair of right angle supports 115 and 116. Right angle supports 115 and 116 are held in place by additional reinforcing blocks 117 and 118 which have slotted holes 121 and 122 therein designed to accept a pair of bolts 119 and 120 which anchor the whole assembly to end wall 10. Slots 121 and 122 permit the wear plate assemblies to be slid back and forth under the action of a pair of threaded adjustment bolts 123 and 124 which are mounted in anchoring blocks 125 and 126. Blocks 125 and 126 are welded to end member 10. On the very end of blade carrier 42 a number of roller bearings 130 are located by a slotted plate 128. If these bearings alone were viewed from the side the sectional schematic view of FIG. 6 would result. In FIG. 6 it can be seen that each of the roller bearings 130 is located by a single slot in slotted plate 128. These roller bearings help blade 42 to move easily up and down despite the large lateral force provided by the hydraulic cylinder forcing the roller assemblies against the inclined ramps at the top of blade carrier 42. The wear plate assembly of FIG. 5 may also be utilized at the right hand side of the blade carrier assembly although at this side the roller bearings may be omitted if desired.

Returning to FIG. 1 and FIG. 2 it may be seen that after the shear cut has been completed blade carrier 42 will rise again to its predetermined position under the influence of springs 54 and 56. When the hydraulic pressure is released cylinder 94 is also urged back to its starting position by means of a large return spring 132 which is most clearly shown in FIG. 2. Return spring 132 forces a washer 133 and a rod 134 to the right in FIG. 2 so as to pivot a lever 136 about a pivot bolt 138. In FIG. 1 it may be seen that pivot bolt 138 is mounted in a small bracket 140 which is welded at its end to the side of end panel 12 and also along its edges to the rear bracket 95. The top of lever 136 is connected to a chain 142 which is connected to cross piece 90 and hence pusher bars 80 and 82. It may thus be seen that spring 132 is always expanding against the action of hydraulic cylinder 94 so as to help return the cylinder to the rest position after a cutting stroke.

Figure 7:
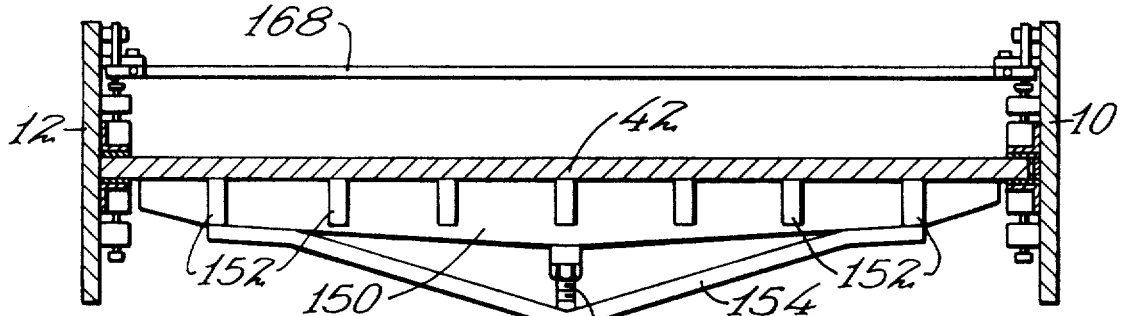
FIG. 7 is a sectional view of the cutting blade as viewed from above and taken along line 7—7 in FIG. 2.

In FIG. 7 a sectional view of the cutting blade positioned in the wear plate assemblies is shown. In FIG. 7 it can be seen how the cutting blade 42 is reinforced against any pressure induced distortion by a horizontal reinforcement plate 150 which is welded along the bottom edge of the blade carrier 42. Additional reinforcement is provided by a series of seven triangular gussets designated by the numeral 152 in FIG. 7 which are welded to horizontal reinforcement plate 150 and to blade carrier 42. Extending outward from the edge of horizontal reinforcement member 150 is a truss bar 154 which is welded to member 150 at each end and supported over an adjustable bolt and bracket assembly 156. Truss bar 154 operates in conjunction with reinforcement strip 150 to make cutting blade carrier 42 extremely rigid without the addition of a great amount of extra weight and bulk. By adjusting bolt 156 to the proper tension, cutting blade carrier 42 and blade 40 can be kept perfectly straight despite the application of enormous amounts of force from the hydraulic cylinder operating through the four ramps.

Figure 8:
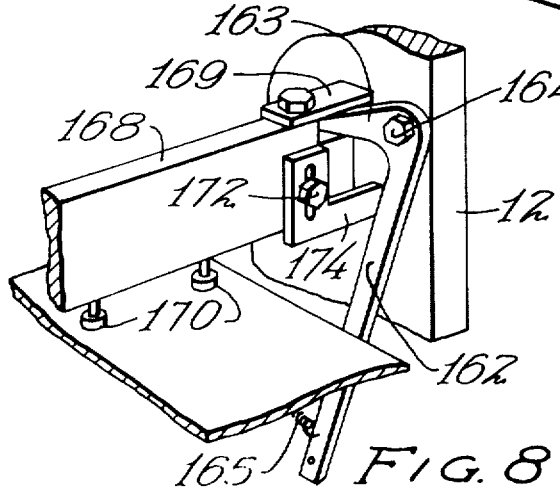
FIG. 8 is a perspective detailed view of the unique clamping arrangement which is also shown in FIG. 3.

During the cutting operation it is necessary to provide apparatus to hold the plate to the top of table 108. Referring simultaneously to FIGS. 3 and 8 it may be seen that a hydraulic cylinder 160 can be activated to push upon a lever 162. Lever 162 pivots about a bolt 164 which is inserted into end panel 12. The hooked portion of lever 162 designated as portion 163 will then press downward against a presser bar 168. Presser bar 168 extends across the work table over the plate being sheared to another hydraulic cylinder and lever assembly at the other side. The two lever assemblies work in conjunction to lower presser bar 168 against the material being worked. On the bottom of presser bar 168 are a series of adjustable feet 170 which are screwed in and out in order to provide a snug even contact all the way across presser bar 168. In FIG. 3 it can be seen that hydraulic cylinder 160 is simply inserted into a notch in transverse member 14 and connected at its opposite end to lever 162. A spring 165 mounted between lever 162 and transverse member 14 keeps tension on lever 162 and holds hydraulic cylinder 160 in place. Although again the connections are not shown, the hydraulic cylinders for these clamps are connected to the same pump as the cutting blade actuating cylinder. Since there is less resistance in these clamps, they tighten up first, holding the metal plate in position before the larger cylinder begins to bring the cutting plate down. When the pump is turned off and the cutting blade starts to return to normal the oil will also drain from hydraulic cylinder 160 and its counterpart on the opposite wall thus allowing spring 165 to pull lever 162 back to the rest position. As the lever pivots about point 164 the hooked portion of the lever 163 engages a small contact plate 169 which is bolted down to the top of presser bar 168 so as to lift presser bar 168 clear of the material. At each end of presser bar 168 a bolt 172 extends outward into a slot in a small L-shaped member 174. Each L-shaped member 174 is welded to an end wall so as to provide a support and guide for presser bar 168 in its up and down movement. The hooked portion of the lever 163 is formed with a small rounded end designed to bear against presser bar 168 and contact plate 169 during the upward and downward movements.

From the above description it is apparent that my invention does provide a compact hydraulic plate shear of relatively lightweight construction which avoids many of the problems apparent in the prior art. Since many of the details herein are preferred choices only the following set of claims are intended to cover the invention in its true scope including any variations which do not depart from the spirit of the invention.

I claim:

1. A hydraulic metal plate shears comprising in combination:
    a frame
    a fixed shearing blade
    a movable shearing blade, mounted for sliding movement in said frame;
    ramp means on said movable blade,
    a set of roller assemblies positioned to roll between said frame and said ramp means so as to move said movable blade past said fixed blade in a shearing relationship;
    connector bars connected to said rollers; and
    hydraulic means on said frame operable to move said connector bars so as to move said rollers between the frame and ramp means.

2. The apparatus of claim 1 including first spring means on said frame operable to urge said movable blade away from said fixed blade and second spring means on said frame operable to urge said rollers out from between said frame and ramp means.

3. The apparatus of claim 2 including a reinforcing truss bar on said movable blade positioned to prevent distortion of said movable blade relative to said fixed blade.

4. The apparatus of claim 3 including clamp means to hold metal plate in position between said blades, said clamp means mounted for sliding movement on said frame and actuated by a pair of high leverage levers, said levers hydraulically actuated from said hydraulic means.

5. The apparatus of claim 4 in which said movable blade comprises a rectangular four edged blade carried at a slight angle in a slot in a blade carrier, said blade carrier being supported on rods connected to said first spring means and guided by adjustable guideways at its edges in said frame.

6. The apparatus of claim 5 including a roller bearing means between one edge of said blade carrier and its guideway.

7. The apparatus of claim 6 in which said ramp means comprises a plurality of ramp shaped blocks on the top edge of said blade carrier.

8. The apparatus of claim 7 in which said roller assemblies each comprise an axle which supports a central roller shaped to ride on one of said ramp shaped blocks and a pair of slightly larger rollers on said axle on each side of the central roller shaped to ride along a first transverse member in said frame, said axle being carried at its end by said connector bars.

9. The apparatus of claim 8 in which said hydraulic means includes a pump driven main hydraulic cylinder connected to said connector bars and said levers are each actuated by a hydraulic cylinder adapted to be driven from the same pump as the main hydraulic cylinders.

10. The apparatus of claim 9 in which said first transverse member is welded at its ends to said frame and in which said fixed blade is mounted to a second transverse member which is welded at its ends into said frame.

* * * * *